United States Patent
Keohane et al.

(10) Patent No.: US 9,756,065 B2
(45) Date of Patent: Sep. 5, 2017

(54) SEQUENCING VIRTUAL MACHINES

(71) Applicant: International Business Machines Corporation, Armonk, NY (US)

(72) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 14/867,098

(22) Filed: Sep. 28, 2015

(65) Prior Publication Data

US 2017/0093898 A1    Mar. 30, 2017

(51) Int. Cl.
 H04L 29/06   (2006.01)
 G06F 9/455   (2006.01)
 G06F 17/30   (2006.01)

(52) U.S. Cl.
 CPC ...... *H04L 63/1425* (2013.01); *G06F 9/45558* (2013.01); *G06F 17/30876* (2013.01); *H04L 63/1416* (2013.01); *H04L 63/20* (2013.01); *G06F 2009/4557* (2013.01); *G06F 2009/45587* (2013.01)

(58) Field of Classification Search
 CPC . G06F 9/45558; G06F 9/45533; H04L 63/20; H04L 63/1425
 See application file for complete search history.

(56) References Cited

U.S. PATENT DOCUMENTS

| 5,907,834 A | 5/1999 | Kephart et al. |
| 8,762,958 B2 | 6/2014 | Golender et al. |

(Continued)

FOREIGN PATENT DOCUMENTS

GB   2465495 B   3/2013

OTHER PUBLICATIONS

Chebotko, et al., "Scientific Workflow Provenance Querying with Security Views", The Ninth International Conference on Web-Age Information Management WAIM '08 Proceedings. IEEE, 2008. DOI:10.1109/WAIM.2008.41 8 pages.

(Continued)

*Primary Examiner* — Dao Ho
(74) *Attorney, Agent, or Firm* — Michael Purdham

(57) ABSTRACT

A method for sequencing virtual machines in a shared pool of configurable network computing resources comprises sequencing at least one computing element for one or more virtual machines into a respective one or more profiles. Each virtual machine corresponds to a respective profile. The method also includes storing the one or more profiles in a security database and identifying a first group of virtual machines and a second group of virtual machines. The first group of virtual machines corresponds to a security incident in the shared pool of configurable network computing resources. The method also comprises comparing profiles of the first group of virtual machines with profiles of the second group of virtual machines and determining an alteration plan based on the comparison of profiles of the first group with profiles of the second group. The alternation plan is related to the profiles of the second group of virtual machines.

12 Claims, 6 Drawing Sheets

(56) References Cited

U.S. PATENT DOCUMENTS

| | | |
|---|---|---|
| 8,782,404 B2 | 7/2014 | Lamb |
| 2013/0254833 A1 | 9/2013 | Nicodemus et al. |
| 2014/0258446 A1* | 9/2014 | Bursell .............. G06F 15/177 709/217 |
| 2014/0351934 A1* | 11/2014 | Mitra .................. G06F 21/567 726/23 |
| 2016/0205518 A1* | 7/2016 | Patel .................. H04L 67/1002 455/518 |

OTHER PUBLICATIONS

Harmer, et al. "An Artificial Immune System Architecture for Computer Security Applications", IEEE Transactions on Evolutionary Computation, vol. 6, No. 3, Jun. 2002. pp. 252-280.

Li, et al., "Electronic Document Security Sharing System Based on Lineage Mechanism", IEEE, Third 2008 International Conference on Convergence and Hybrid Information Technology. DOI 10.1109/ICCIT.2008.312 pp. 602-606. © 2008 IEEE.

Li, et al., "Malware Obfuscation Measuring via Evolutionary Similarity", IEEE, 2009 First International Conference on Future Information Networks. 4 pages.

Mell, et al., "The NIST Definition of Cloud Computing", Recommendations of the National Institute of Standards and Technology, Special Publication 800-145. Sep. 2011. 7 pages.

Thimbleby, et al., "A framework for modelling trojans and computer virus infection", Computer Journal, 41(7), pp. 444-458,1999. Last printed Nov. 5, 2014, 2:26 PM. 26 pages. http://vxheaven.org/lib/aht01.html.

* cited by examiner

SEQUENCING VIRTUAL MACHINES

BACKGROUND

The present disclosure relates generally to cybersecurity, and more particularly, to sequencing virtual machines in a shared pool of configurable network computing resources. The amount of cybersecurity required for virtual machine usage is growing at an increasing rate. However, the variance in applications for virtual machines can make recognizing a security incident in a shared pool of configurable network computing resources easier for some applications and more difficult for others.

SUMMARY

Aspects of the disclosure provide a method, system, and computer program product for sequencing virtual machines in a shared pool of configurable network computing resources. In one embodiment, the method comprises sequencing at least one computing element for one or more virtual machines into a respective one or more profiles. Each virtual machine corresponds to a respective profile of the one or more profiles. The method also includes storing the one or more profiles in a security database and identifying a first group of virtual machines and a second group of virtual machines. The first group of virtual machines corresponds to a security incident in the shared pool of configurable network computing resources. In response to identifying the first group of virtual machines with the security incident, the method comprises comparing profiles of the first group of virtual machines with profiles of the second group of virtual machines. The profiles of the first group of virtual machines and the profiles of the second group of virtual machines are retrieved from the security database. The method also includes determining an alteration plan based on the comparison of profiles of the first group with profiles of the second group. The alternation plan is related to the profiles of the second group of virtual machines.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
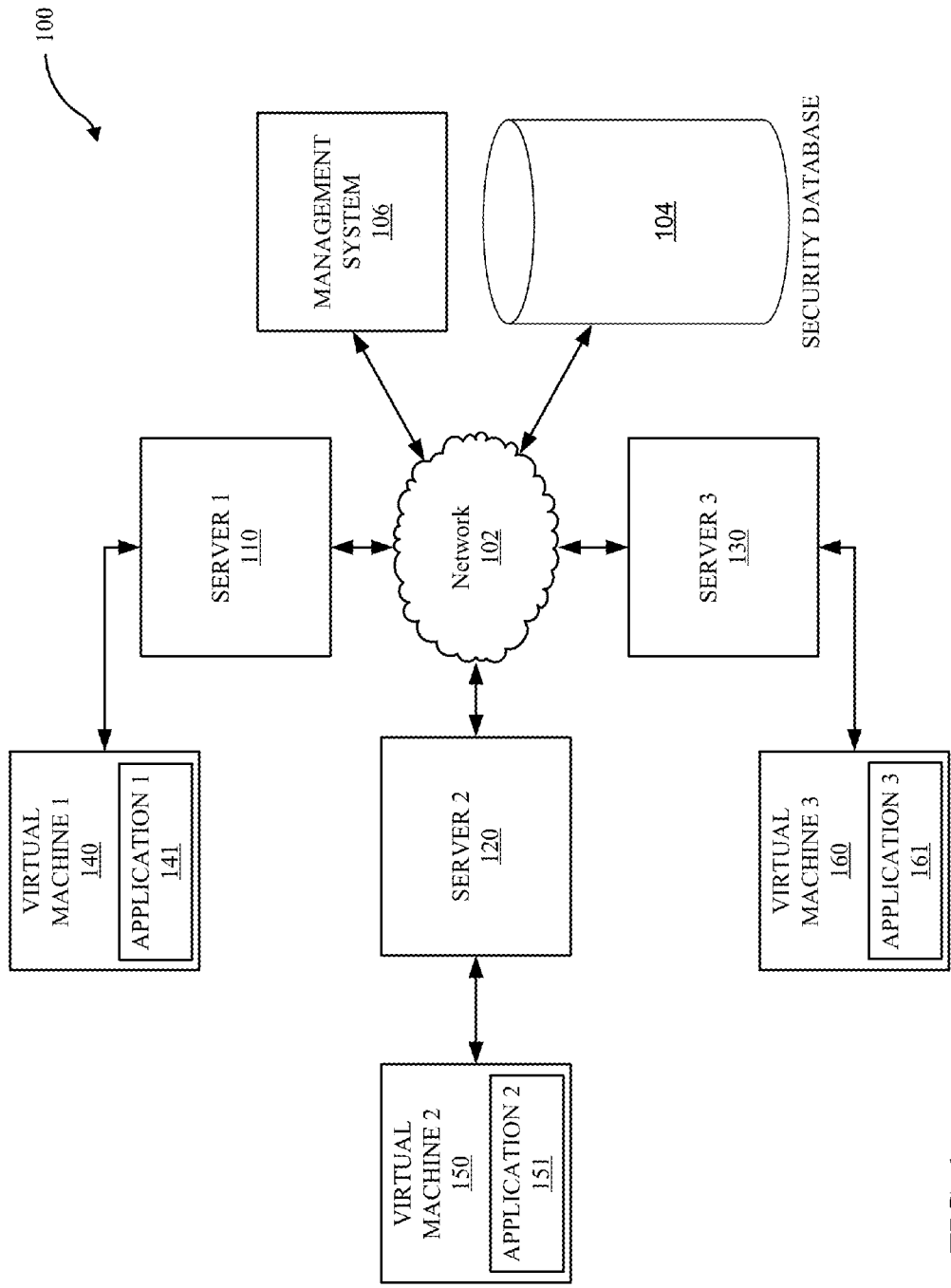
FIG. 1 depicts a block diagram of one example of a virtual environment that can be configured to perform one or more of the methods described herein, according to embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to cybersecurity. In various embodiments, more particular aspects relate to sequencing virtual machines in a shared pool of configurable network computing resources. While the present disclosure is not necessarily limited to such applications, various aspects of the disclosure can be appreciated through a discussion of various examples using this context.

A computer virus is a malware program that, when executed, replicates by inserting a variety of copies of itself into other computer programs, data files, or areas of the hard drive within a computer system. When the replication succeeds, the affected areas are then said to be "infected." Computer viruses often perform some type of harmful activity on infected hosts (e.g., computers), such as stealing hard disk space, central processing unit (CPU) time, accessing private information, corrupting data, displaying inappropriate messages or images on the display of the computer, and even rendering the computer useless. However, not all viruses carry a destructive payload or attempt to hide themselves. Rather, the defining characteristic of a computer virus is that they are self-replicating computer programs which install themselves without user consent.

Computer viruses may be destructive to some computer systems and may be benign to other computer systems. Depending on the software and software levels installed on the system or the configuration settings on the computer's operating system and applications, a virus may or may not be effective. In addition to computer viruses, there are other forms of computer vulnerabilities. A computer system may have a security vulnerability based on the software and software levels installed on the system or even the configuration settings of the system. It may have an application installed which has an inherent exploitable security vulnerability. Another system may have the same software installed, but a configuration setting that makes it non-exploitable. In large datacenters or highly virtualized systems running hundreds or thousands of virtual machines, where each system may contain different software, software levels, and/or configuration settings, it can be difficult to determine why one system or set of systems is vulnerable and breached, and another set remains secure and untouched.

Computer viruses currently cause billions of dollars' worth of economic damage each year by causing system failures and increasing maintenance costs. Furthermore and unfortunately, the process of identifying a virus outbreak and protecting vulnerable computer systems can be tedious and in the domain of a specific skillset. For example, different types of antivirus software employ a variety of detection methods, such as signature-based detection or heuristic-based detection, to combat computer viruses. A security intelligence platform running within a computer system can collect data (e.g., log feeds) from customer computer systems and run analytics on the data to detect intrusions. When the analytics flag a potential issue, the potential issue can be verified as an actual security incident and the customer is notified. The customer can then remediate the situation and attempt to restore services.

However, verifying the potential issues as actual security incidents and restoring services can be a lengthy process. Specifically, restoring services can be time consuming because determining the nature of vulnerability for the computer system and how to prevent the computer virus from doing any further damage is challenging. For example, the current state of the art for determining the nature of vulnerability for a computer system is to snapshot the system memory and run virus scan tools on the memory in case the computer system has encountered this same virus before. If the computer system has encountered the virus before, patches and/or updates can already be available, and restoring services can be straightforward. However, if the security incident is a 0-day attack (e.g., once a flaw becomes known, the programmer or developer has zero days to fix it), the process of restoring services can take much longer because antivirus software has to analyze the memory and piece together the infected system to identify code responsible for the security incident.

In the context of computer systems, and more specifically, virtual machines (VMs) deployed within a virtual environment, there exists similarities between virtual machines and living organisms. For instance, deoxyribonucleic acid (DNA) is the genetic coding containing parent genetic information (e.g., an organism's DNA is derived from its parents) which provides instructions for building living organisms, such as viruses. Similarly, when VMs are deployed within a virtual environment, they are emulations of a particular computing system. VMs operate based on the computer architecture and functions of a real or hypothetical computer, and their implementations can involve specialized hardware, software, configuration settings or a combination of all. This helps explain why VMs can deploy in minutes, because it is not necessary to install the entire operating system (OS). Rather, the VM simply links and uses the OS within its virtualized environment. Although the VM is not an exact clone of the base system (e.g., the VM must contain some unique files such as user passwords, Internet Protocol addresses, unique application installations), the components of the virtual machine stem from the base system.

Aspects of the present disclosure provide a method for sequencing virtual machines in a shared pool of configurable network computing resources. The method can include characterizing a plurality of computing elements for one or more virtual machines into one or more profiles. In certain embodiments, each virtual machine can correspond to a profile. In further embodiments, computing elements can include, but are not limited to, network ports, subnetworks, virtual local area networks (VLAN), security/antivirus configurations (e.g., firewall settings), application instances, OS version.release.modification.fix (VRMF), and OS patches (e.g., updates). In various embodiments, the "OS version" can refer to the increments increase for a change to the functions and features of a software product. In further embodiments, the "OS release" can refer to the increments increase as new functions or features are released. In further embodiments, the "OS modification" can refer to increments increase when a function or feature is modified. In further embodiments, the "OS fix" can refer to increments for each group of program temporary fixes (PTFs) that are released. In some embodiments, PTFs can fix code problems but not change the function of the code.

The profiles of the virtual machines can be stored in a security database. In some embodiments, the security database can be a location (e.g., servers) where profiles for sequenced virtual machines as well as data (e.g., log feeds) from customer computer systems are stored. A first group of VMs and a second group of VMs can be identified. In various embodiments, the first group of VMs can contain a security incident in the shared pool of configurable network computing resources. In certain embodiments, a security incident can include a VM becoming compromised due to a computer virus and/or a lack of computing stability within the virtual environment. For example, a lack of computing stability can include a lack of computer resources which can cause a virtual machine and/or the server hosting the virtual machine to crash.

In response to identifying the first group of VMs with the security incident, profiles corresponding to the first group of VMs can be compared with profiles corresponding to the second group of VMs by retrieving the respective profiles from the security database. Based upon comparing the profiles of the first group of VMs with the profiles of the second group of VMs, an alternation plan can be recommended. In various embodiments, the alternation plan can be related to the profiles of the second group of VMs.

Turning now to the figures, FIG. 1 depicts a block diagram of one example of a virtual environment 100 that can be configured to perform one or more of the methods described herein. The virtual environment 100 can include a network 102, a security database 104, a management system 106; multiple servers 110, 120, and 130; and multiple virtual machines 140, 150, and 160. Management system 106 can include one or more computers including software configured to manage the use of the servers 110, 120, and 130. In some embodiments, management system can be operated by a system administrator responsible for overseeing virtual environment 100. In certain embodiments, the management system 106 can utilize software configured to manage the use of the servers 110, 120, and 130 to sequence the virtual machines 140, 150 and 160 to generate profiles for each of the virtual machines 140, 150 and 160. In further embodiments, the management system 106 can monitor the virtual machines 140, 150, and 160 such that when the computing elements of the virtual machines 140, 150, or 160 change, the management system 106 can sequence the virtual machines 140, 150, or 160 to update their respective profiles.

Servers within virtual environment 100 can host virtual machines. In the illustrated embodiment, server 110 hosts virtual machine 140, server 120 hosts virtual machine 150, and server 130 hosts virtual machine 160. These servers can be housed at the same location or can be geographically remote from each other. Each server 110, 120, and 130 can communicate with each other (and, likewise, with management system 106) through the network 102. While three servers and three virtual machines are shown for illustrative purposes in FIG. 1, it is contemplated that dozens, hundreds, or even thousands of both servers and associated virtual machines can be used in some embodiments. Further, in some embodiments, multiple virtual machines can be hosted on each server, for example, there can be a ratio of about 10 to 1, virtual machines to host severs, in some such embodiments of the virtual environment.

Within the virtual environment 100, any number of virtual machines can be included as is represented by virtual machines 1, 2, and 3 (referenced by numerals 140, 150, and 160, respectively). There can be a combination of virtual machines that have existed for a substantial time in the virtual environment and other virtual machines that are newly initialized within the virtual environment. These new virtual machines can previously have been hosted by other servers outside of the virtual environment 100. Within each virtual machine, there can be an application 141, 151, and 161. Although it is contemplated that each virtual machine can include more than one application, single applications are depicted here for the purpose of clarity (e.g., in order to show simplified workloads). Furthermore, it is contemplated that, in some embodiments, the virtual machines can having differing sets of resource requirements, for example, where they are running different applications or applications of varying types (e.g., databases, word processing programs, gaming software, etc.).

In some embodiments, the network 102 can be implemented by any number of any suitable communications media (e.g., wide area network (WAN), local area network (LAN), Internet, Intranet, etc.). In some embodiments, the virtual environment 100 can be implemented within a cloud computing environment, or using one or more cloud computing services. As described in more detail elsewhere herein, a cloud computing environment can include a network-based, distributed data processing system that provides one or more cloud computing services.

The security database 104 can be used to store profiles for sequenced virtual machines generated by the management system 106. Storing the profiles for sequenced virtual machines in the security database 104 can include organizing the profiles according to specific customer settings, required computing resources to run a particular profile, or based on a similarity of computing elements, such as similar firewalls settings, antivirus settings, applications installed, install levels, OS patch levels, and/or configuration settings.

Figure 2:
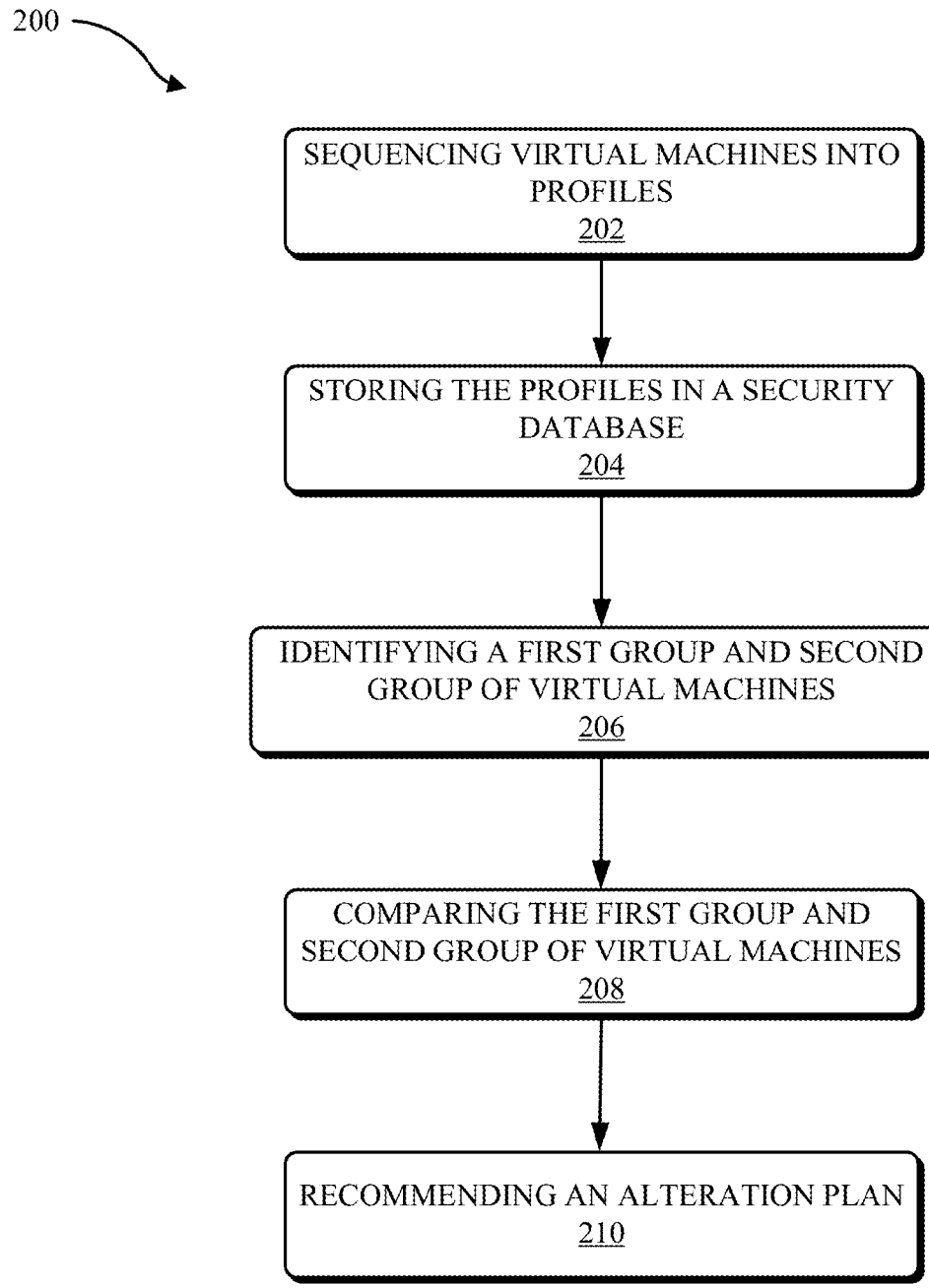
FIG. 2 depicts one embodiment of an example process for sequencing virtual machines, according to embodiments.

FIG. 2 depicts one embodiment of an example process 200 for sequencing virtual machines, according to embodiments. It is to be understood that the order in which the blocks described below are discussed is not to be construed as limiting the order in which the individual acts can be performed. In particular, the acts performed can be performed simultaneously or in a different order than that discussed. In various embodiments, one or more of the acts described with respect to the process 200 can be implemented via a processor executing instructions stored within a server, such as the servers 110, 120, or 130 discussed above with respect to FIG. 1.

The process 200 can begin at block 202 where the virtual machines are sequenced into profiles. In various embodiments, sequencing the virtual machines within the shared pool of configurable network computing resources can include identifying the various computing elements being utilized by the virtual machines and organizing the computing elements into profiles. The profiles can have a standard format where the computing elements within each virtual machine is listed in the same order for each virtual machine sequenced. For example, a standard profile can list the network ports, then the security/antivirus settings, then the applications running on the virtual machine, and so forth.

In some embodiments, the computing elements can be identified by a management system or system administrator responsible for overseeing the virtual environment that the virtual machines are deployed within. In certain embodiments, sequencing the virtual machines within the shared pool of configurable network computing resources can include sequencing the virtual machines before, during, and/or after the virtual machines have been deployed. For example, a virtual machine can be sequenced based upon the initial settings before deployment, and then sequenced again once one of the computing elements has changed.

At block 204, the profiles generated at block 202 are stored in a security database. Aspects of the security database can be similar to or the same as aspects described in FIG. 1 with respect to the security database 106.

At block 206, a first group of virtual machines and a second group of virtual machines are identified. In some embodiments, a plurality of separate groups of virtual machines can be identified according to similar computing elements within profiles. In certain embodiments, identifying a first group of virtual machines and a second group of virtual machines can include receiving at the management system for the virtual environment a notification of a security incident within the virtual environment. The security incident can correspond to a virtual machine deployed within the virtual environment. The profile of the virtual machine corresponding to the security incident can be analyzed by the management system in order to identify other virtual machines with similar profiles which can be at risk to the same security incident or are likely infected. For example, if a virtual machine has been flagged for a security incident, the management system can locate the profile of the virtual machine from the security database and begin to group profiles of virtual machines together accordingly to similarity of computing elements. It is to be understood that similarity can be determined using various techniques. For example, a predetermined difference threshold can be set in some embodiments, a predetermined number of matching categories, having an OS version within some predetermined difference, etc. Therefore, a first group of virtual machines can be identified as having similar profiles to the virtual machine corresponding to the security incident whereas a second group of virtual machines can be identified as low risk or not affected by the security incident.

Hence, identifying the first and second groups of virtual machines can include, in some embodiments, comparing a profile of one or more virtual machines corresponding to the security incident with respective profiles of other virtual machines and grouping virtual machines having respective profiles similar to the profile of the one or more virtual machines corresponding to the security incident in the first group. The virtual machines having respective profiles that are not similar to the profile of the one or more virtual machines corresponding to the security incident are grouped into the second group. Comparing the profiles can include, in some embodiments, comparing an update status (e.g. OS version, OS patch number, application version, etc.) in the profiles of the one or more virtual machines corresponding to the security incident with the update status of the other virtual machines. Similarity in the profiles can be determined based on whether or not the respective update status of the other virtual machines is within some predetermined range or tolerance level of the update status of the virtual machines corresponding to the security incident, as indicated by the respective profiles.

At block 208, the profiles of one or more virtual machines corresponding to the security incident are compared with profiles stored in the security database. In some embodiments, comparing the profiles of the virtual machines corresponding to the security incident with the profiles stored in the security database can include comparing the computing elements utilized in each respective profile. For example, within a profile of a virtual machine corresponding to a security incident, the firewall settings utilized by the virtual machine corresponding to the security incident can be compared with the firewall settings utilized by a virtual machine not currently affected by the security incident. In certain embodiments, each computing element within each respective profile can be compared with one another, and the differences determined can be compiled and stored in the security database for later retrieval.

At block 210, an alteration plan is recommended based upon the comparison performed at block 208. In some embodiments, the alternation plan can be based upon the amount of computing resources required to change and/or update the computing elements of a virtual machine at risk to a security incident. For example, if a first profile is identified as a virtual machine containing a security incident, a second profile is identified as a virtual machine immune to the security incident, and a third profile is identified as a virtual machine at risk to the security incident, the second profile may be used to determine which computing elements need to be updated and/or changed in the first and third profiles. In various embodiments, the alternation plan can be displayed on a graphical user interface.

Figure 3:
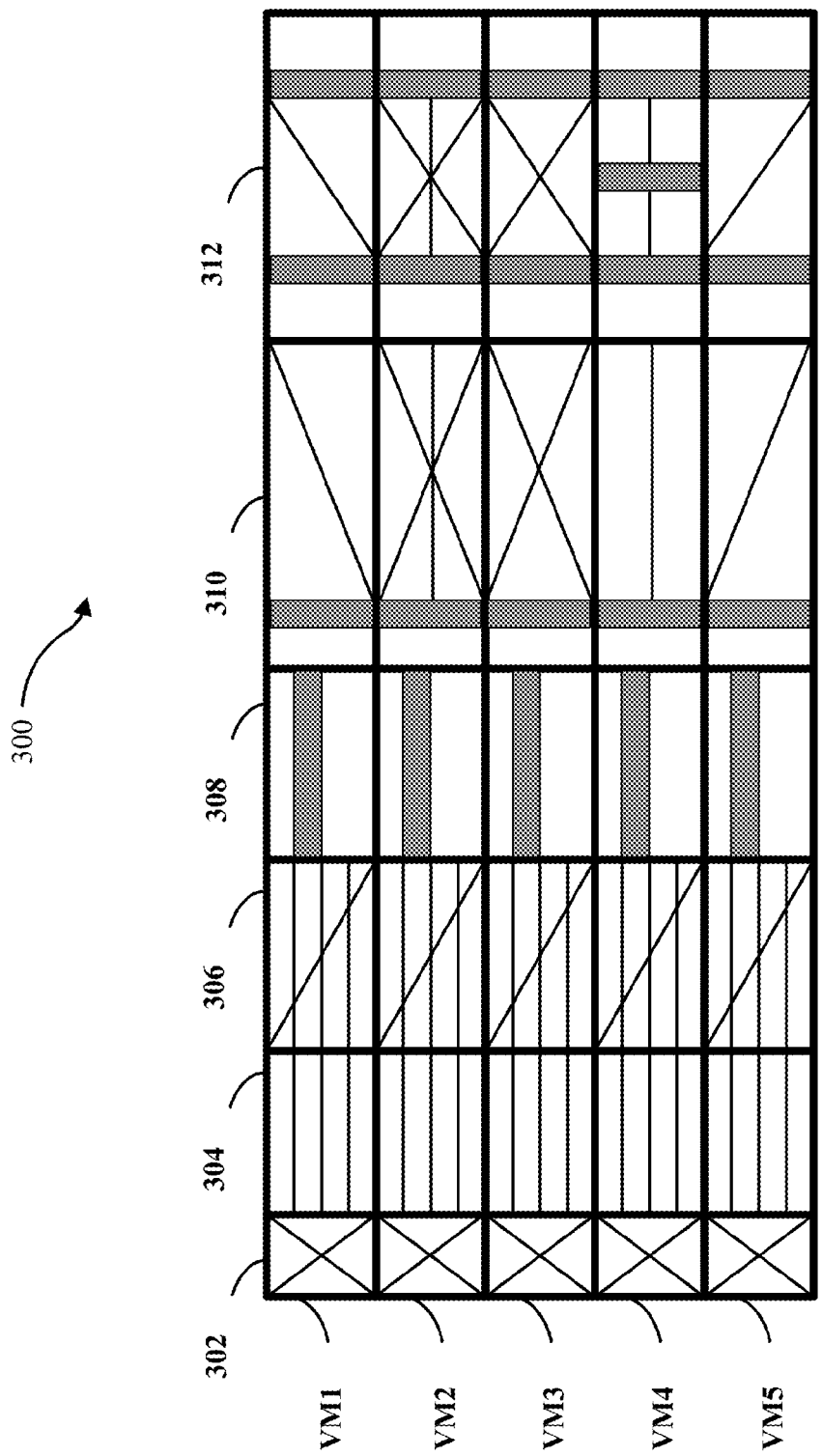
FIG. 3 depicts one embodiment of example profiles for sequenced virtual machines, according to embodiments.

FIG. 3 depicts one embodiment of example profiles for sequenced virtual machines, according to embodiments. Each row in the table 300 corresponds to a profile for a sequenced virtual machine, as indicated by VM1, VM2, VM3, VM4, and VM5. Each column in the table 300 corresponds to a specific computing element being utilized by the virtual machines VM1, VM2, VM3, VM4, and VM5. For instance, column 302 represents the host (e.g., server) running the virtual machine, column 304 represents the network ports and domains (e.g., subnets, VLANs) being utilized by the virtual machine, column 306 represents the security (e.g., firewall settings)/antivirus settings being utilized by the virtual machine, column 308 represents the platform (e.g., the environment which computer software is designed to be run within) being utilized by the virtual machine, column 310 represents the type and/or amount of applications (e.g., word documents, video conferencing services) being run on the virtual machine, and column 312 represents the OS VRMF of the virtual machine. Hence, through the sequencing represented by the patterns in FIG. 3, it can be determined, for example, which profiles correspond to systems which have never been updated (e.g. OS updates), those which have the most current updates, and those which have some updates.

It is to be understood that the patterns displayed in the example table 300 are for illustrative purposes only and are not to be taken in a limiting sense. The patterns are shown to differentiate the various settings a profile for a virtual machine can contain. Thus, it is to be understood that the patterns shown can be replaced with respective data (e.g. alphanumeric data or binary data) or other visual indicators (e.g. colors, gradients, etc.) representing settings of a profile. Furthermore, it is to be understood that the specific categories represented by the columns 304-312 can include other categories in addition to or in lieu of those mentioned above. The patterns can be used to identify profiles which have been contaminated by a security incident, profiles which are susceptible to the security incident, or profiles which are immune to the security incident.

For example, after the profiles of the virtual machines have been sequenced (e.g., block 202 in FIG. 2), it could be determined that in a system of 60,000 virtual machines, 5000 correspond to the profile for VM1, 15,000 correspond to the profile for VM2, 10,000 correspond to the profile for VM3, 10,000 correspond to the profile for VM4, and 20,000 correspond to the profile for VM5. As the profiles are stored in the security database, a security incident could be detected in the virtual machines corresponding to VM3. The profiles for VM1, VM2, VM4, and VM5 could then each be compared against the profile for VM3 to determine which other virtual machines are at risk due to similar computing elements. As each of the profiles are compared with one another, the management system can further determine which profile can be used as a standard profile to identify which computing elements for the virtual machines corresponding to the profile for VM3 need to be modified. For instance, the management system could identify which virtual machines have not been patched with similar OS settings to VM3 and are therefore not susceptible to the security incident. In another instance, the management system could identify which virtual machines have the most up to date firewall settings and are therefore unlikely to be susceptible to the security incident.

Continuing the example, if it is determined that the profile for VM2 is immune to the security incident and is the closest to the profile for VM3 without requiring the most changes to the computing elements for VM3, the profile for VM2 can be used as the model for other virtual machines at risk to the security incident to be able to identify which respective computing elements require modification. In some embodiments, changing the computing elements for virtual machines can include shutting down the host running the virtual machines to update and/or rebuild the computing elements being utilized by a virtual machine.

It is understood in advance that although this disclosure includes a detailed description on cloud computing, implementation of the teachings recited herein are not limited to a cloud computing environment. Rather, embodiments of the present invention are capable of being implemented in conjunction with any other type of suitable computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
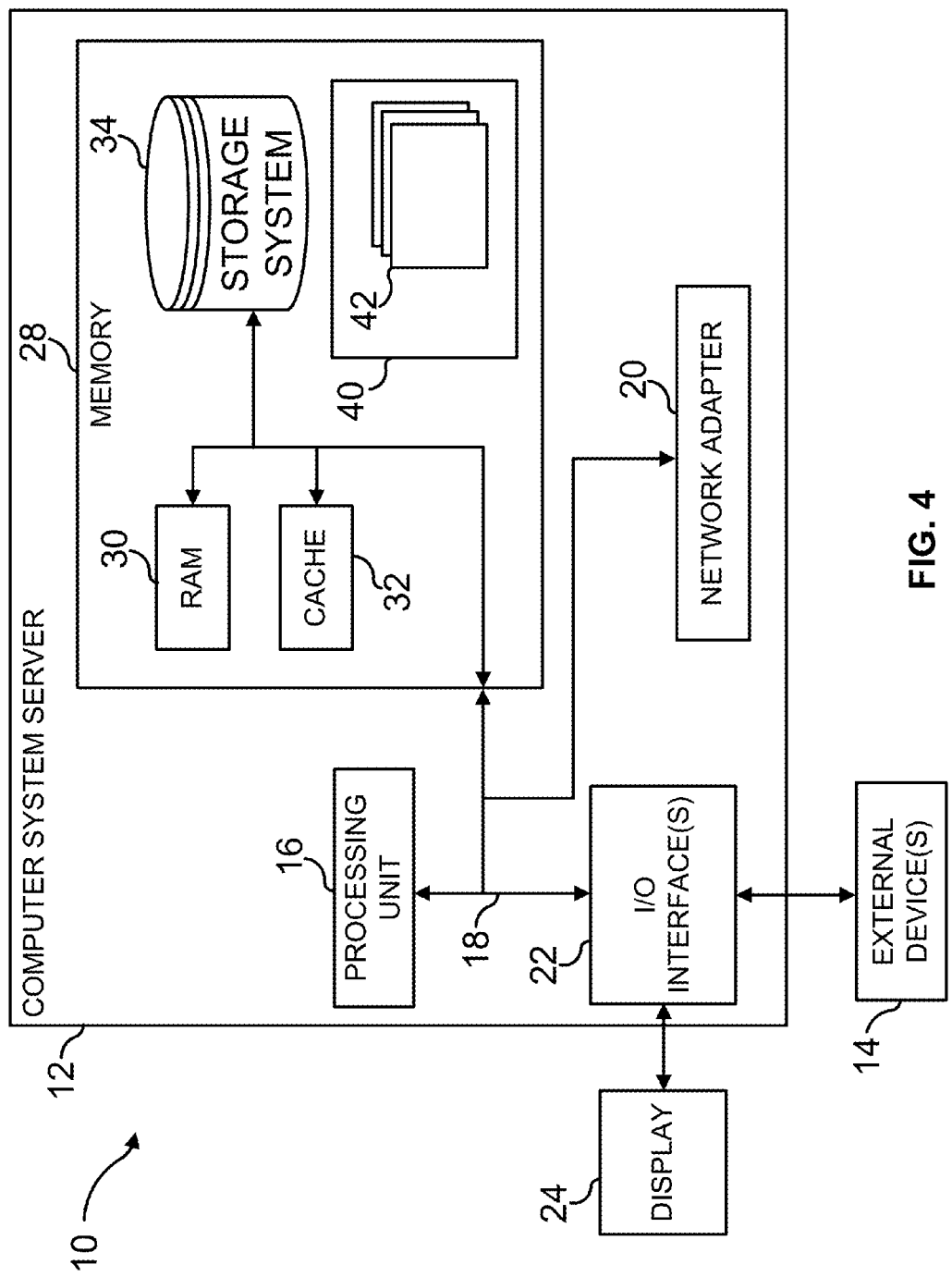
FIG. 4 depicts a cloud computing node, according to embodiments.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 4, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID systems, tape drives, and data archival storage systems, etc.

Figure 5:
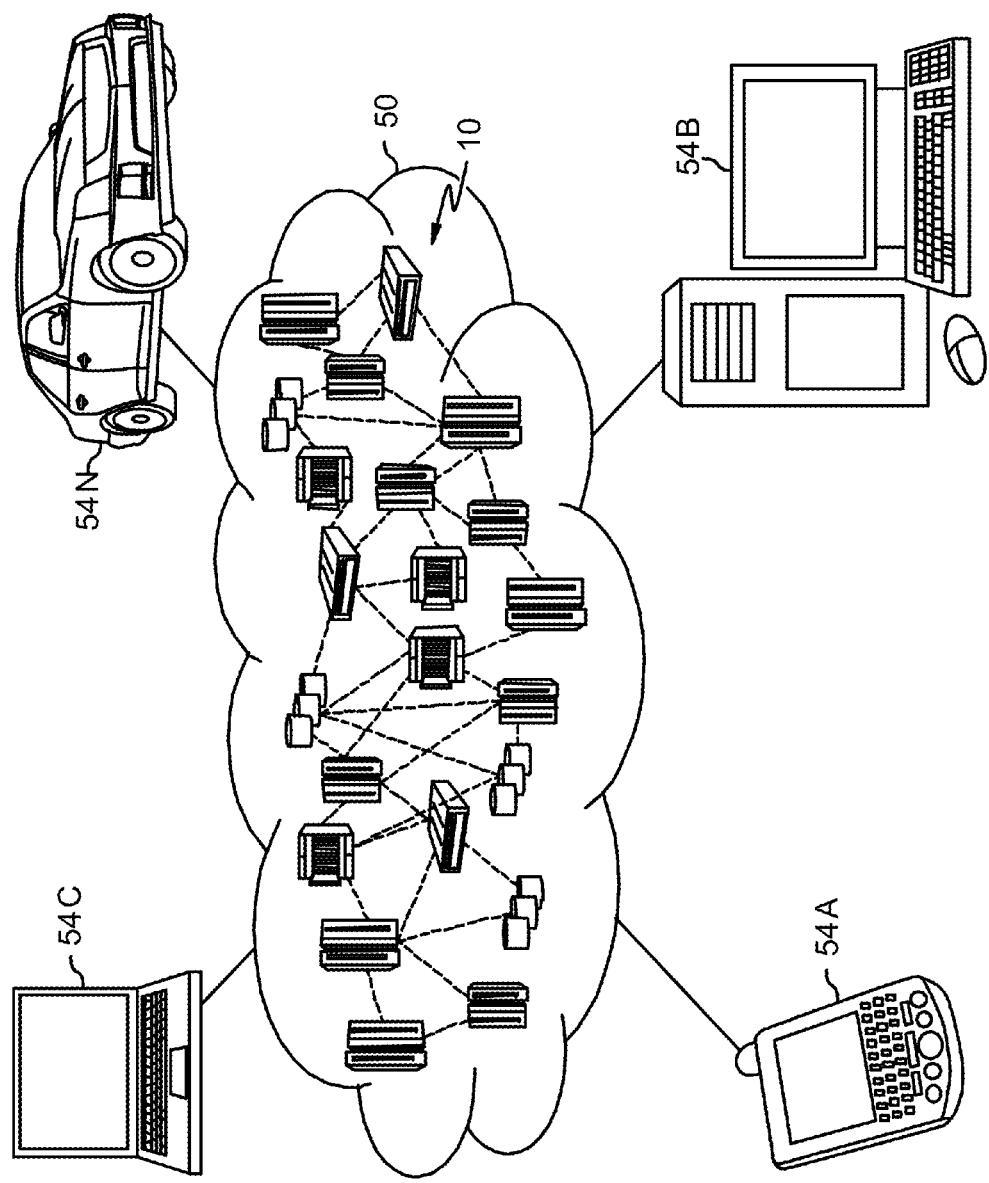
FIG. 5 depicts a cloud computing environment, according to embodiments.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 6:
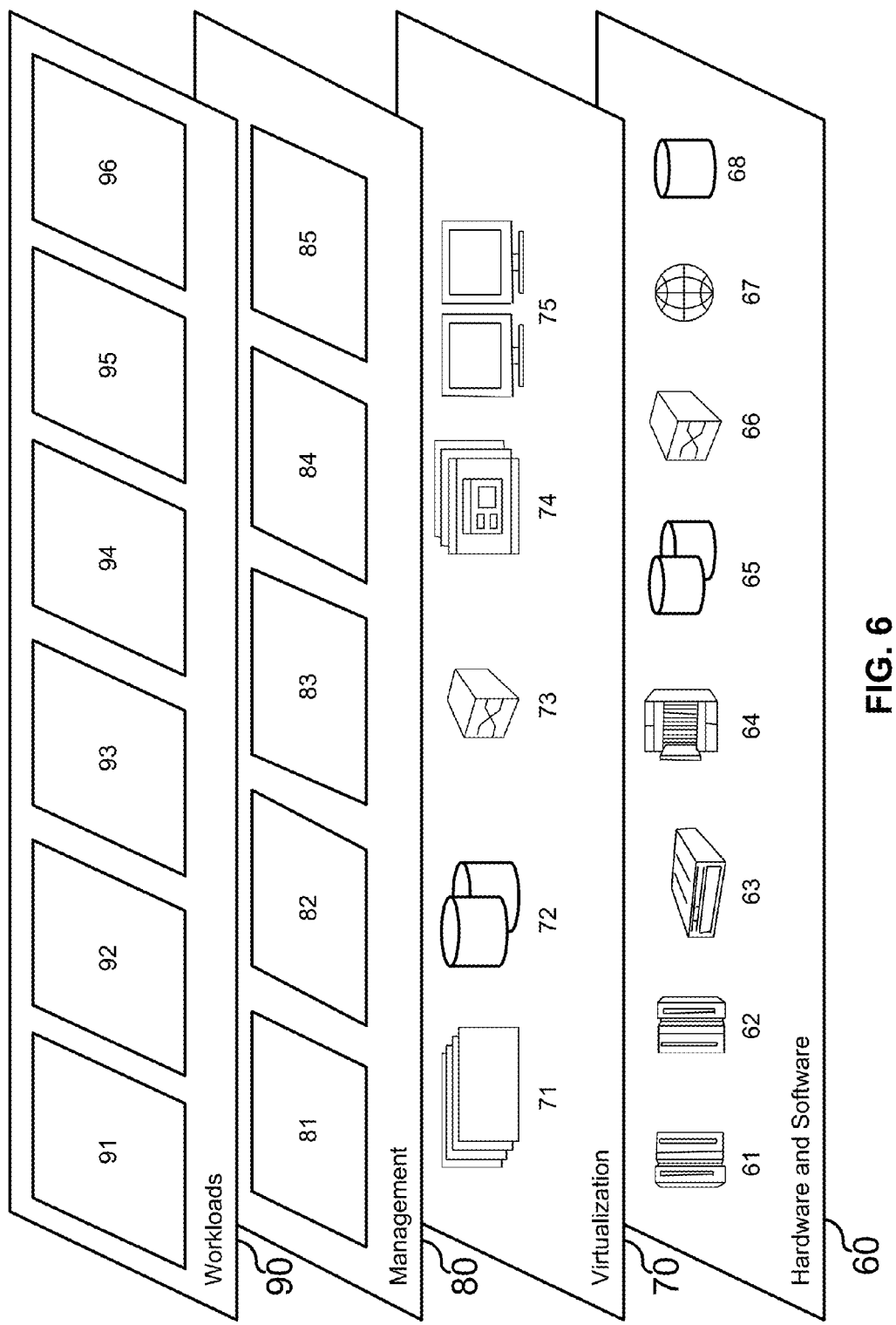
FIG. 6 depicts abstraction model layers, according to embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75. In embodiments, the virtualization layer 70 can be used to monitor and sequence virtual machines running in the virtual environment into profiles.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and management system 96. The management system 96 can monitor the computing elements of virtual machines deployed within a virtual environment. In certain embodiments, the management system 96 can be used to sequence virtual machines into profiles and store them in a security database. In some embodiments, the management system 96 can compare the profiles of virtual machines previously sequenced to determine the amount of computing resources necessary to modify a virtual machine such that it is immune to or has a reduced likelihood of susceptibility to an identified security incident.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for sequencing virtual machines in a shared pool of configurable network computing resources, comprising:
   sequencing at least one computing element for two or more virtual machines into a respective two or more profiles, wherein the at least one computing element comprises one or more of network ports, subnetworks, virtual local area networks (VLAN), security settings, application instances, operating system version, or operating system patches, wherein each virtual machine corresponds to a respective profile of the two or more profiles;
   storing the two or more profiles in a security database;
   identifying a first group of virtual machines and a second group of virtual machines, wherein the first group of virtual machines corresponds to a security incident in the shared pool of configurable network computing resources, and wherein the second group of virtual machines does not correspond to the security incident in the shared pool of configurable network computing resources;

comparing, in response to identifying the first group of virtual machines with the security incident, profiles of the first group of virtual machines with profiles of the second group of virtual machines, wherein the profiles of the first group of virtual machines and the profiles of the second group of virtual machines are retrieved from the security database, and wherein the comparison includes analyzing the profiles of the first group of virtual machines and the profiles of the second group of virtual machines to identify at least one difference between computing elements in the profiles of the first group of virtual machines and computing elements in the profiles of the second group of virtual machines and calculating an amount of computing resources required to alter the computing elements corresponding to the at least one difference in the first group of virtual machines; and determining an alteration plan based on the comparison of profiles of the first group with profiles of the second group, wherein the alteration plan comprises a plan to modify one or more computing elements for virtual machines in the first group of virtual machines to reduce a likelihood of susceptibility to the identified security incident based on the profiles of the second group of virtual machines.

2. The method of claim 1, further comprising:
identifying a change in computing elements for the one or more virtual machines after deployment;
updating the profiles of the one or more virtual machines corresponding to the change identified; and
storing the updated profiles in the security database.

3. The method of claim 1, wherein identifying the first group of virtual machines and the second group of virtual machines comprises:
comparing a profile of a virtual machine corresponding to the security incident with respective profiles of other virtual machines to identify similar profiles;
grouping virtual machines having respective profiles that are similar to the profile of the virtual machine corresponding to the security incident in the first group of virtual machines; and
grouping virtual machines having respective profiles that are not similar to the profile of the virtual machine corresponding to the security incident in the second group of virtual machines.

4. The method of claim 3, wherein comparing a profile of the virtual machine corresponding to the security incident with respective profiles of other virtual machines to identify similar profiles comprises comparing an update status of the profile of the virtual machine corresponding to the security incident with the respective update status of the other virtual machines.

5. A computer system for sequencing virtual machines in a shared pool of configurable network computing resources, comprising:
a database configured to store profiles of the virtual machines within the shared pool of configurable network computing resources;
a network element having a processor configured to deploy virtual machines; and
a computing device communicatively coupled to the database and the network element, the computing device comprising:
a network interface;
a display unit configured to alert a user of a security incident; and
a processor coupled to the memory, the display unit, and the network interface;
wherein the processor is configured to characterize at least one of computing element for two or more virtual machines into a respective two or more profiles, wherein the at least one computing element comprises one or more of network ports, subnetworks, virtual local area networks (VLAN), security settings, application instances, operating system version, or operating system patches, each virtual machine corresponding to a respective profile of the two or more profiles;
wherein the processor is further configured to send the two or more profiles of the virtual machines via the network interface to the database for storage;
wherein the processor is further configured to identify a first group of virtual machines and a second group of virtual machines, the first group of virtual machines being vulnerable to an identified security incident in the shared pool of configurable network computing resources, and the second group of virtual machines not being vulnerable to the identified security incident in the shared pool of configurable network computing resources;
wherein the processor is further configured to compare profiles of the first group of virtual machines with profiles of the second group of virtual machines, wherein the comparison includes analyzing the profiles of the first group of virtual machines and the profiles of the second group of virtual machines to identify at least one difference between computing elements in the profiles of the first group of virtual machines and computing elements in the profiles of the second group of virtual machines and calculating an amount of computing resources required to alter the computing elements corresponding to the at least one difference in the first group of virtual machines; and
wherein the processor is further configured to determine an alteration plan to modify one or more computing elements for virtual machines in the first group of virtual machines to reduce a likelihood of susceptibility to the identified security incident based on the comparison of the profiles of the first group of virtual machines with the profiles of the second group of virtual machines.

6. The computer system of claim 5, wherein the processor is further configured to:
identify a change in computing elements for the one or more virtual machines after deployment;
update the profiles of the one or more virtual machines corresponding to the change identified; and
store the updated profiles in the database.

7. The computer system of claim 5, wherein the processor is configured to identify the first group of virtual machines and the second group of virtual machines by:
comparing a profile of a virtual machine corresponding to the identified security incident with respective profiles of other virtual machines to identify similar profiles;
grouping virtual machines having respective profiles that are similar to the profile of the virtual machine corresponding to the identified security incident in the first group of virtual machines; and
grouping virtual machines having respective profiles that are not similar to the profile of the virtual machine corresponding to the identified security incident in the second group of virtual machines.

8. The computer system of claim 7, wherein the processor is configured to compare an update status of the profile of the virtual machine corresponding to the security incident with the respective update status of the other virtual machines to identify similar profiles.

9. A program product comprising a computer-readable storage medium having program instructions embodied thereon, wherein the program instructions are configured, when executed by at least one programmable processor, to cause the at least one programmable processor to:

characterize at least one computing element for two or more virtual machines into a respective two or more profiles, wherein the at least one computing element comprises one or more of network ports, subnetworks, virtual local area networks (VLAN), security settings, application instances, operating system version, or operating system patches, wherein each virtual machine corresponds a respective profile of the two or more profiles;

identify a first group of virtual machines and a second group of virtual machines, wherein the first group of virtual machines corresponds to a security incident in a shared pool of configurable network computing resources, and wherein the second group of virtual machines does not correspond to the security incident in the shared pool of configurable network computing resources;

compare, in response to identifying the first group of virtual machines with the security incident, profiles of the first group of virtual machines with profiles of the second group of virtual machines, wherein the comparison includes analyzing the profiles of the first group of virtual machines and the profiles of the second group of virtual machines to identify at least one difference between computing elements in the profiles of the first group of virtual machines and computing elements in the profiles of the second group of virtual machines and calculating an amount of computing resources required to alter the computing elements corresponding to the at least one difference in the first group of virtual machines; and determine an alteration plan to modify one or more computing elements for virtual machines in the first group of virtual machines to reduce a likelihood of susceptibility to the security incident based on the comparison of the profiles of the first group of virtual machines with the profiles of the second group of virtual machines.

10. The program product of claim 9, wherein the program instructions are further configured to cause the at least one programmable processor to:

identify a change in computing elements for the one or more virtual machines after deployment;

update the profiles of the one or more virtual machines corresponding to the change identified; and store the updated profiles in a security database.

11. The program product of claim 9, wherein the program instructions are configured to cause the at least one programmable processor to identify the first group of virtual machines and the second group of virtual machines by:

comparing a profile of a virtual machine corresponding to the identified security incident with respective profiles of other virtual machines to identify similar profiles;

grouping virtual machines having respective profiles that are similar to the profile of the virtual machine corresponding to the identified security incident in the first group of virtual machines; and grouping virtual machines having respective profiles that are not similar to the profile of the virtual machine corresponding to the identified security incident in the second group of virtual machines.

12. The program product of claim 11, wherein the program instructions are configured to cause the at least one programmable processor to compare an update status of the profile of the virtual machine corresponding to the security incident with the respective update status of the other virtual machines to identify similar profiles.

* * * * *